United States Patent
Shelor (10) Patent No.: US 7,940,490 B2
(45) Date of Patent: May 10, 2011

(54) APPARATUS AND METHOD FOR IMPROVING BANDWIDTH OF A FINE POSITIONING MECHANISM DATA STORAGE MANUFACTURING AND TEST EQUIPMENT

(75) Inventor: John R. Shelor, San Diego, CA (US)

(73) Assignee: Magnecomp Corporation, Murrieta, CA (US)

( * ) Notice: Subject to any disclaimer, the term of this patent is extended or adjusted under 35 U.S.C. 154(b) by 428 days.

(21) Appl. No.: 12/150,200

(22) Filed: Apr. 26, 2008

(65) Prior Publication Data
US 2009/0268326 A1   Oct. 29, 2009

(51) Int. Cl.
*G11B 5/596* (2006.01)
*G11B 27/36* (2006.01)
(52) U.S. Cl. .................... 360/78.05; 31/77.03; 31/78.11
(58) Field of Classification Search .......................... None
See application file for complete search history.

(56) References Cited

U.S. PATENT DOCUMENTS

| | | | |
|---|---|---|---|
| 6,006,614 A | 12/1999 | Guzik et al. | |
| 6,538,854 B2 * | 3/2003 | Koganezawa et al. | 360/294.4 |
| 6,697,211 B2 * | 2/2004 | Koganezawa | 360/78.12 |
| 6,704,158 B2 * | 3/2004 | Hawwa et al. | 360/77.16 |
| 6,829,115 B2 * | 12/2004 | Liu et al. | 360/31 |
| 7,034,372 B1 | 4/2006 | Kulangara et al. | |
| 7,564,649 B2 * | 7/2009 | Hanchi et al. | 360/234.7 |
| 2002/0057517 A1 | 5/2002 | Takagi et al. | |

* cited by examiner

*Primary Examiner* — Daniell L Negrón
*Assistant Examiner* — Regina N Holder
(74) *Attorney, Agent, or Firm* — Intellectual Property Law Offices of Joel Voelzke, APC (57) ABSTRACT

An apparatus and a method for improving bandwidth of a fine positioning mechanism in data storage manufacturing and test equipment that require fine positioning of a head on or about a track. The method comprises the steps of sensing separate sources of mechanical disturbance that mis-position the head with one or more non-contact position sensors, generating a compensating position control signal from one or more input signals, and positioning the head with a fine positioning mechanism and position control signal. The apparatus uses a shear mode micro-actuator as a fine positioning mechanism.

46 Claims, 8 Drawing Sheets

How to distinguish Shear Mode Piezoelectric Micro-actuators

| Distinguishing Feature | Shear Mode | Trans. or Long. Modes |
|---|---|---|
| 1. Motion | shear | expand and contract |
| 2. Electrical properties | | |
|   a. electrode area | 2 entire surfaces | 2 small areas at beam ends |
|   b. bipolar operation | yes | no |
|   c. E-field orientation to polarization | perpendicular | parallel |
|   d. moderate V- depolarizes | no | yes |
| 3. Mechanical support | | |
|   a. bond along entire length on axis of motion: | yes | no |
|   b. unsupported areas help maximize displacement | no | yes |
| 4. Secondary axis displacement | no | yes, one axis expands while another contracts |
| 5. Mechanical integration properties | | |
|   a. ability to withstand shock | high | low |
|   b. vibration susceptibility | low | high |

APPARATUS AND METHOD FOR IMPROVING BANDWIDTH OF A FINE POSITIONING MECHANISM DATA STORAGE MANUFACTURING AND TEST EQUIPMENT

FIELD OF THE INVENTION

The present invention relates to the manufacturing and test equipment used in the data storage industry that require a read/write head to be finely positioned on or about a data track and more particularly, to an apparatus and a method for improving bandwidth of a fine positioning mechanism.

BACKGROUND ART

Increasing storage capacity is a goal in the data storage industry. Data storage products, such as magnetic disk drives, optical disk drives and magnetic tape drives, store tracks of digital information on a moving medium using one or more read/write heads. As track widths decrease, the recording head must be more accurately positioned to compensate for mechanical disturbance that degrades the head signal by mis-positioning the head relative to the track. Because micro-actuators operating with increased bandwidth remove more mechanical disturbance, a method and apparatus is desired that improves the mechanical bandwidth of the micro-actuator and the electrical bandwidth of the position control signal.

The data storage industry has a large investment in manufacturing and test equipment. This equipment also requires a fine positioning mechanism with improved bandwidth.

Manufacturing and test equipment for the magnetic and optical disk drive industries comprise a head tester, a disk tester, a disk certifier, a media certifier, a servo track writer, a head/disk tester and a spinstand. Head/disk testers are used to qualify the head and disks and to extend recording technology. Media certifiers characterize the magnetic and mechanical properties of a disk and can improve performance by burnishing the disk surface to reduce head/disk spacing. Servo track writers record servo patterns on disks; the amount of written-in run-out and the placement accuracy of the servo pattern affect track squeeze, track density and how well the disk drive performs. A spinstand is an equipment subsystem that mechanically positions a head so it can fly on a spinning disk at the desired radius, skew angle and z-height using one or more positioning mechanisms. Added to the spinstand subsystem are sensors, mechanics, electronics and software to measure various aspects of disk drive performance. All of these types of manufacturing and test equipment need a fine positioning mechanism with improved bandwidth.

By extension, the same fine positioning improvements needed by the magnetic and optical disk drive industries are needed by the tape drive industry. Whereas magnetic and optical disk equipment use a spinstand where the disk medium is rotated, tape drive equipment use a test stand wherein the tape medium is moved linearly in either a loop or reel to reel. Tape heads need to be precisely located on or about the data track on the moving medium. Mechanical disturbance occurs in this equipment that displace the head relative to the track. This equipment too needs a fine positioning mechanism with improved bandwidth as track widths decrease.

Data storage manufacturing and test equipment for magnetic, optical and tape drives all have a head, a medium, a motor that moves the medium, tracks of data recorded on a medium and a requirement for fine positioning of a head on or about a track.

Regarding the notion of positioning a head "on or about a track," the "on track" refers to positioning the head at the track center as best as possible and the "about a track" refers to purposely positioning the head a defined distance off-track from track center as is required for measuring track profile, evaluating error rates and writing servo patterns. All references to positioning are along the off-track axis, and more specifically, the axis perpendicular to the recorded track and in-plane with the disk surface, except where noted. In this disclosure, "head" is also synonymous with "head assembly" and "HGA." In the disk drive industry, an "HGA" is a "head gimbal assembly" comprising a suspension assembly, slider and transducer. Also, the word "micro-actuator" is used as one type of "fine positioning mechanism."

For many years the head was positioned on or about the track by simply positioning the head at the desired location with no active positioning. Mechanical disturbance, such as due to floor vibration, thermal drift and vibration internal to the equipment, caused minimal degradation to the head signal. However as track widths have decreased over time, mechanical disturbance has become more significant, causing the head to move on and off track and the head signal to degrade.

Manufacturing and test equipment now use track following to generate a position control signal that drives a micro-actuator to actively position the head on or about a track. Micro-actuators are typically made from voice coil or piezoelectric motors. These micro-actuators have difficulty moving the mass of the head and the intervening hardware quickly and accurately enough and thus suffer from insufficient mechanical bandwidth.

The most stringent demand for a high bandwidth micro-actuator and position control signal comes from the disk drive industry. While the foregoing disclosure uses a spinstand for the disk drive industry as its example, it is understood that the present invention is not limited to a spinstand.

The mechanical bandwidth of a micro-actuator can be improved by reducing moving mass, increasing mechanical stiffness, reducing vibration and maximizing single axis, in-plane motion by minimizing off-axis distortion.

Related art U.S. Pat. No. 6,006,614 to Guzik et al. entitled "Apparatus and method for improving dynamic characteristics of a fine positioning mechanism in a magnetic head/disk tester" and U.S. Patent Application 20020057517 to Takagi et al. entitled "Head clamping apparatus for magnetic disk tester and magnetic disk tester" describe micro-actuators that fine position a head on or about a track. Both use a piezo actuator that "expands and contracts" deforming a second structure whose mechanical purpose is to convert the deforming motion into a single axis, in-plane displacement. In U.S. Pat. No. 6,006,614, the deformed structure is a "hollow parallelepiped." In U.S. Patent Application 20020057517 the deformed structure is a "parallel plate spring" structure. In both related arts, the intervening hardware between the piezo actuator and head has spring, frame and cantilever structures.

In the context of improved bandwidth, the above related art's fine positioning mechanism displaces excessive mass between the piezo actuator and the head, has insufficient stiffness, has undesirable vibration modes and has off-axis distortion. Regarding mass, the deformable structure adds mass. Regarding stiffness, vibration and off-axis distortion, the deformable structure is purposely made less stiff on the axis of motion which inadvertently decreases the stiffness on other axes, causing the structure to be more prone to vibration and off-axis distortion on the pitch, roll or yaw axes. Higher mass and lower stiffness reduce resonance frequencies. Resonance modes within operating bandwidth of the micro-actuator are unacceptable. Furthermore, frame, spring and cantilever structures have less stiffness and vibrate more than solid, fully supported structures of equal mass.

Micro-actuators need to provide single axis, in-plane motion across the entire operating bandwidth. What is desired is an apparatus and a method for a fine positioning mechanism that avoids frame, spring and cantilever structures and reduces moving mass, increases mechanical stiffness, reduces vibration and reduces off-axis distortion.

A micro-actuator with improved mechanical bandwidth cannot be fully utilized if the position control signal driving the micro-actuator does not have a matching, improved electrical bandwidth.

In related art, the position control signal is the output of a position control system whose feedback signal comes from a position sensor and/or from track following. For example, related art U.S. Patent Application 20020057517 also describes a positioning control system that switches between a precise positioning mode that uses an optical sensor to sense the position of the micro-actuator and a track following mode that senses the relative position of the head to the track.

Track-following is an embedded servo technique that is used throughout the disk drive industry for actively positioning a head relative to a track. In track following, servo bursts are recorded on a disk, a head reads the servo bursts to sense the head's position relative to the track, a position error signal (PES) is created and a control loop generates a compensating track following signal that drives a micro-actuator and positions the head on the track. Track following is effective because it measures position where it counts: exactly between the head and track where all sources of mechanical disturbance are sensed at once.

However, track following provides a position feedback signal that has limited bandwidth because head position is sampled. There is no positioning information between servo bursts. The bandwidth of the head position signal is determined from the number of servo bursts per disk revolution and the disk spin rate (RPM) or equivalently, the sampling rate. Increasing the number of servo bursts per disk revolution increases the bandwidth. The number of servo bursts is limited in a practical sense because any disk area set aside for recording servo bursts takes away disk area for storing data. For example, it is common for 10 percent of the disk area to be dedicated to the embedded servo leaving 90 percent of the disk area for recording data, for a disk efficiency of 90%. Track following bandwidth has a practical limit determined by disk efficiency. Track following bandwidth is further limited because the position signal from track following must be over-sampled. An industry guideline advocates a minimum of 10 times over-sampling. Because phase delay and aliasing result from insufficient over-sampling and filtering, an even greater over-sampling factor is desired for manufacturing and test equipment.

Increasing the electrical bandwidth of the position control signal requires that the bandwidth of the positioning control system be increased. The bandwidth of a positioning control system is dependent upon the mechanical bandwidth of the micro-actuator, the electrical bandwidth of the position sensing signal and the open loop gain cross-over frequency. Increasing the bandwidth of the positioning control system faces several challenges in addition to the limited electrical bandwidth of the track following signal and the mechanical bandwidth of the micro-actuator. Mechanical resonance in the head suspension assembly and other structures cause Bode plot peaks that challenge loop stability. The micro-actuator and position sensor are not collocated in track following mode. Finally, the head's suspension assembly is not adequately stiff on the off-track axis causing head actuation loss.

Positioning control system bandwidth has historically been greater disk drives than manufacturing and test equipment, even when both use track following, because disk drives have a higher mechanical bandwidth head positioning mechanism and because their entire electromechanical system is highly optimized. For example, disk drives can optimize performance by using notch filters whose center frequencies match specific resonance frequencies of the head and other structural components. In contrast, manufacturing and test equipment is used to test a variety of heads and disks, which inhibits a high level of optimization. Manufacturing and test equipment has the same bandwidth limitations as disk drives plus the added limitations of being required to quickly adapt to many different types of heads and disks.

The purpose of a micro-actuator and its position control signal is to remove mechanical disturbance that mis-positions the head up to the bandwidth of the positioning control system and hence the importance of improving bandwidth. Sources of mechanical disturbance in a spinstand comprise spindle run-out, disk flutter, head vibration, spinstand vibration, windage and thermal drift. Mechanical disturbance from the rotating spindle and disk are decomposed into repeatable run-out (RRO) and non-repeatable run-out (NRRO) components. When servo track writers record servo patterns, mechanical disturbance perturbs what would otherwise be a perfectly circular track, with the resulting distortion called written-in run-out (WI-RO). What is needed is an apparatus and a method for improving bandwidth of a fine positioning mechanism in data storage manufacturing and test equipment that separately senses and compensates different types of mechanical disturbance.

OBJECTS AND SUMMARY OF THE INVENTION

It is an object of the present invention to provide an apparatus and a method for improving the bandwidth of a fine positioning mechanism in data storage manufacturing and test equipment that require fine positioning of the head on or about a track.

Another object of this invention is to provide the aforementioned equipment with an apparatus and a method for reducing the mass that the micro-actuator positions.

Another object of this invention is to provide the aforementioned equipment with an apparatus and a method for increasing the stiffness of the micro-actuator.

A further object of this invention is to provide the aforementioned equipment with an apparatus and a method for providing single axis, in-plane position change with reduced vibration and off-axis distortion.

Still another object of this invention is to provide the aforementioned equipment with an apparatus and a method for integrating the micro-actuator into a head tool.

Another object of this invention is to provide the aforementioned equipment with an apparatus and a method for improving electrical bandwidth of the position control signal.

Still another object of this invention is to provide the aforementioned equipment with an apparatus and a method for separately sensing and compensating different types of mechanical disturbance.

A first embodiment of the invention is a method for improving bandwidth of a fine positioning mechanism in data storage manufacturing and test equipment that require fine positioning of a head on or about a track comprising the step of: using a shear mode micro-actuator comprising a positive electrode, a negative electrode and a shear mode piezoelectric material, being either a single layer or a multi-layer stack, with a polarization parallel to both said positive electrode and said negative electrode, wherein said positive electrode undergoes a single axis, in-plane position change relative to said negative electrode through the inverse piezoelectric effect, in a direction parallel to the polarization and in-plane with the positive electrode when a position control signal is applied across said positive electrode and said negative electrode.

A second embodiment of the invention is a shear mode micro-actuator for data storage manufacturing and test equipment that require fine positioning of a head on or about a track comprising a positive electrode, a negative electrode and a shear mode piezoelectric material, being either a single layer or a multi-layer stack with a polarization parallel to both said positive electrode and said negative electrode, wherein said positive electrode undergoes a single axis, in-plane position change relative to said negative electrode through the inverse piezoelectric effect, in a direction parallel to the polarization and in-plane with the positive electrode when a position control signal is applied across said positive electrode and said negative electrode. The shear mode micro-actuator may be comprised of a single crystal or polycrystalline shear mode piezoelectric material, either in a single layer or a multi-layer stack. To the shear mode micro-actuator electrodes may be mounted or bonded, a plate comprised of metal or ceramic having mounting surfaces for a head or a head tool.

Because of its compact size, this shear mode actuator can be located much closer to the head, which decreases the amount of hardware between the micro-actuator and head and reduces moving mass. Because of its solid-state design with fully supported surfaces, this shear mode actuator achieves stiffness on all axes and decreases vibration susceptibility. The shear motion generated by a shear mode micro-actuator provides single axis, in-plane motion with minimal off-axis distortion. The shear mode micro-actuator can be integrated into a shear mode micro-actuated spinstand 24 and other data storage manufacturing and test equipment. When the shear mode micro-actuator is integrated into a head tool, the only external component to move is a head, which reduces moving mass and improves bandwidth.

A third embodiment of the invention is a data storage manufacturing and test apparatus that requires the fine positioning of a head on or about a track. Said apparatus is comprised of a head, a medium, a motor that drives the medium and a shear mode micro-actuator. An example of such an apparatus is shear mode micro-actuated spinstand 24 described herein. Shear mode micro-actuated spinstand 24 may have one or more non-contact position sensors for sensing mechanical disturbance that mis-positions the head relative to the track. High bandwidth non-contact position sensors are used to sense the relative position of at least one member of the collection comprising the spindle, disk, shear mode micro-actuator and head. Types of non-contact position sensor comprise an optical position sensor, a capacitance gage, an interferometer or a laser Doppler vibrometer. Types of mechanical disturbance include at least one member of the collection comprising spindle run-out, disk flutter, head vibration and spinstand vibration. This apparatus is configured with additional hardware and software to perform the function of a head tester, a disk tester, a tape tester, a disk certifier, a media certifier, a servo track writer, a head/disk tester, a spinstand or a test stand.

A fourth and final embodiment of the invention is a method for improving bandwidth of a fine positioning mechanism in data storage manufacturing and test equipment that requires fine positioning of a head on or about a track comprising the steps of:
    sensing separate sources of mechanical disturbance that mis-position the head with one or more non-contact position sensors,
    generating a compensating position control signal from one or more input signals, and
    positioning the head with a fine positioning mechanism and position control signal.

Sources of mechanical disturbance include at least one member of the collection comprising spindle run-out, disk flutter, head vibration and spinstand vibration. One or more non-contact position sensors sense the relative position of at least one member of the collection comprising a spindle, a disk, a spindle run-out reference disk, a fine positioning mechanism and a head. Types of input signals include at least one member of the collection comprising spindle run-out, disk flutter, head vibration and spinstand vibration. Additional input signals comprise a track following input signal and a compensating track following signal. A compensating position control signal is generated with further steps depending upon its purpose comprising: inverting the phase and adjusting the gain of the input signal, preserving the phase and adjusting the gain of the input signal, multiplying a signal by a transfer function, correcting the gain and phase of a head vibration input signal based upon the frequency response function of the head and superimposing two or more compensating position control signals into a single position control signal. The preferred type of fine positioning mechanism is a shear mode micro-actuator.

The electrical bandwidth of the position control signal is improved by increasing the mechanical bandwidth of the micro-actuator and by increasing the bandwidth of the feedback signal with high bandwidth position sensors. The position control signal is also improved by reducing distortion and noise with input signals from high resolution (low noise and distortion) position sensors.

An application of the present invention is provided by way of example and not limitation. Head vibration is sensed as the signal difference between a first laser Doppler vibrometer (LDV) that measures the relative position of head's transducer and a second LDV that measures the relative position of a micro-actuator to which a head is mounted. With the differential signal from the two LDVs sampled at 500 kHz and with a 20 times over-sampling rate, the head vibration signal has an upper bandwidth of 25 kHz. Inverting the phase and adjusting the gain of the head vibration input signal generates a compensating head vibration signal whose purpose is to attenuate head vibration. The lower bandwidth of the compensating head vibration signal is cut-off with a high pass filter at a frequency selected to match the upper bandwidth of a compensating track following signal. Superimposing the compensating track following signal, having low bandwidth, with the high bandwidth compensating head vibration signal produces a single position control signal with improved bandwidth. The head is then positioned with a shear mode micro-actuator and the position control signal.

A second application is provided by way of example and not limitation that separately senses head vibration, spindle run-out and disk flutter using multiple LDVs. Each mechanical disturbance is separately sensed using a 500 kHz sampling rate. With a 20 times over-sampling rate, the bandwidth of the position input signals are 25 kHz. Each input signal is separately compensated with transfer functions. Whereas the compensating head vibration signal is generated by inverting the phase and adjusting the gain of the head vibration input signal to attenuate head vibration, the compensating spindle run-out and disk flutter signals are generated by preserving the phase and adjusting the gain of their respective input signals for the purpose of reducing written in run-out though common mode rejection. All compensating signals are superimposed into a single position control signal. The head is positioned by the shear mode micro-actuator and the position control signal.

This apparatus and method has application for reducing head vibration, reducing written-in run-out, improving track following and reducing the mis-positioning of the head on or about a track. By positioning the head in-phase with the sensed spindle run-out and disk flutter disturbances, written-in run-out is reduced through common mode rejection. By positioning the head out-of phase with the sensed head vibration disturbance, head vibration is attenuated with negative feedback. Reducing written-in run-out and head vibration improves track following and reduces the mis-positioning of the head on or about a track.

BRIEF DESCRIPTION OF THE DRAWINGS

The foregoing and other objects, features and advantages of the invention will be apparent from the more particular description of preferred embodiments of the invention, as illustrated in the accompanying drawings in which the like reference characters refer to the same parts throughout the different views. The drawings are not necessarily to scale, emphasis instead being placed upon the illustrating the principles of the invention.

DETAILED DESCRIPTION OF PREFERRED EMBODIMENTS

The invention will now be further described in detail with reference to the preferred embodiments of data storage manufacturing and test equipment that require fine positioning of a head on or about a track and a method for improved bandwidth of a fine positioning mechanism.

Figure 1:
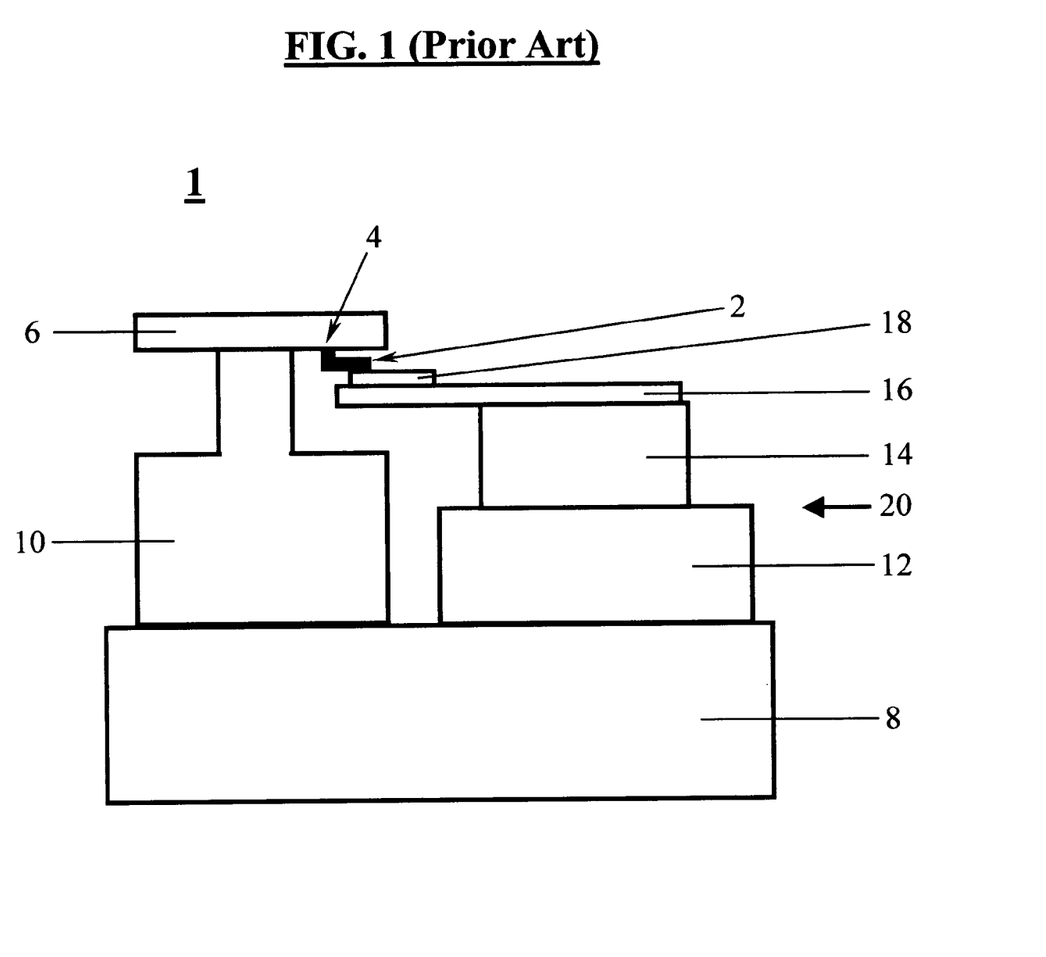
FIG. 1 is a side view schematic of a related art spinstand consistent with U.S. Pat. No. 6,006,614 having a piezoelectric micro-actuator that positions the arm, head tool and head.

FIG. 1 is a side view schematic of related art spinstand 1 that is consistent with U.S. Pat. No. 6,006,614. A spinstand 1 is a subsystem of the manufacturing and test equipment used in the disk drive industry that positions a head 2 on or about a track 4 recorded on disk medium 6. Spinstand 1 consists of a base 8 on which a spindle motor 10 rotates disk medium 6. Spinstand 1 also has attached to base 8 a coarse positioning mechanism 12, a fine positioning mechanism 14 and an arm 16. Separate from spinstand 1 is an optional, removable head tool 18 that mounts to arm 16 and a head 2 that mounts to head tool 18. If head tool 18 is not present, then head 2 mounts to arm 16.

Head tool 18 has incorporated features that mechanically and electrically interface head 2 to spinstand 1. Head tool 18 enables an operator to quickly, safely and precisely load and unload head 2 to and from spinstand 1. Head tool 18 also enables different head products to be tested on spinstand 1 with minimal change time.

Arm 16 is commonly used in a spinstand 1 to provide a mechanical extension that locates head 2 above or below disk medium 6 because coarse positioning mechanism 12 and spindle motor 10 are physically large and mechanically interfere when mounted on base 8. When head 2 is positioned below disk medium 6, there is limited vertical space between disk medium 6 and spindle motor 10. Note that if spinstand 1 does utilize an arm 16, then head tool 18 or head 2 mounts to fine positioning mechanism 14.

A position control signal 20 instructs coarse positioning mechanism 12 and fine positioning mechanism 14 to position head 2 on or about track 4. For example, a position control signal 20 may passively position head 2 at a particular radius and skew angle on disk medium 6 using the coarse positioning mechanism 12. Position control signal 20 may actively position head 2 on track 4 using track following. Sometimes head 2 is positioned a defined distance off from the center of track 4 for writing servo patterns, measuring track profiles and measuring error rate. Position control signal 20 is derived from track following and/or position sensor input signals.

Related art, U.S. Pat. No. 6,006,614 assigned to Guzik Technical Enterprises, discloses a fine positioning mechanism 14 comprised of a piezoelectric micro-actuator that "expands and contracts" to fine position a head 2 on or about a track 4. Three aspects of this related art are significant. The first aspect is that the fine positioning mechanism 14 is located between coarse positioning mechanism 12 and arm 16 so the micro-actuator has to actively move the heavy mass of arm 16. The other two aspects are that the piezoelectric micro-actuator "expands and contracts" and that the piezo micro-actuator deforms a "hollow parallelepiped" structure. How these last two aspects limit micro-actuator bandwidth is later discussed.

Related art U.S. Patent Application 20020057517 describes how micro-actuator bandwidth can be improved by moving the micro-actuator closer to a head 2 and actively positioning less mass. This related art utilizes a piezo actuator that "expands and contracts" and deforms a "parallel plate spring" structure. How micro-actuator bandwidth is limited by a micro-actuator that "expands and contracts" and deforms a "parallel plate spring" structure is later discussed.

Figure 2:
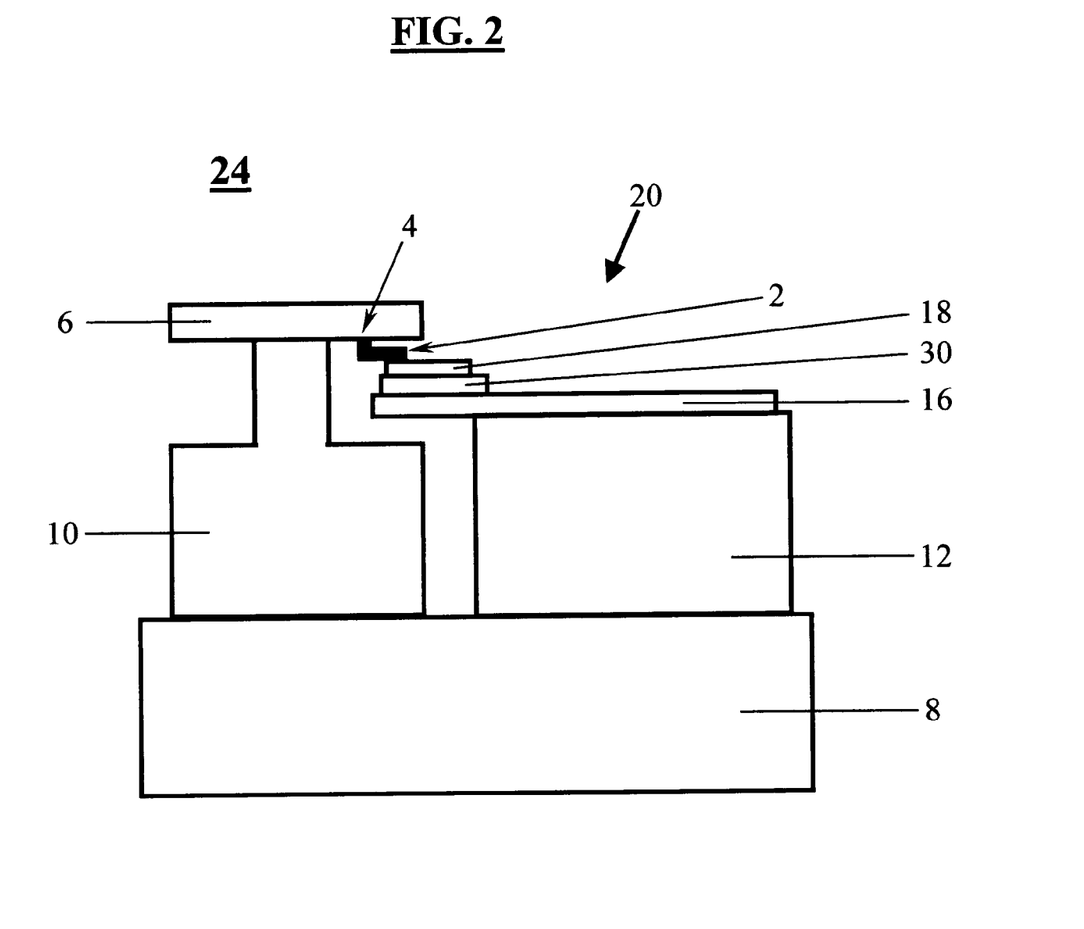
FIG. 2 is a side view schematic illustrating a shear mode micro-actuator integrated into a spinstand, wherein the shear mode micro-actuator interfaces with the head tool and positions the head tool and head.
Figure 3:
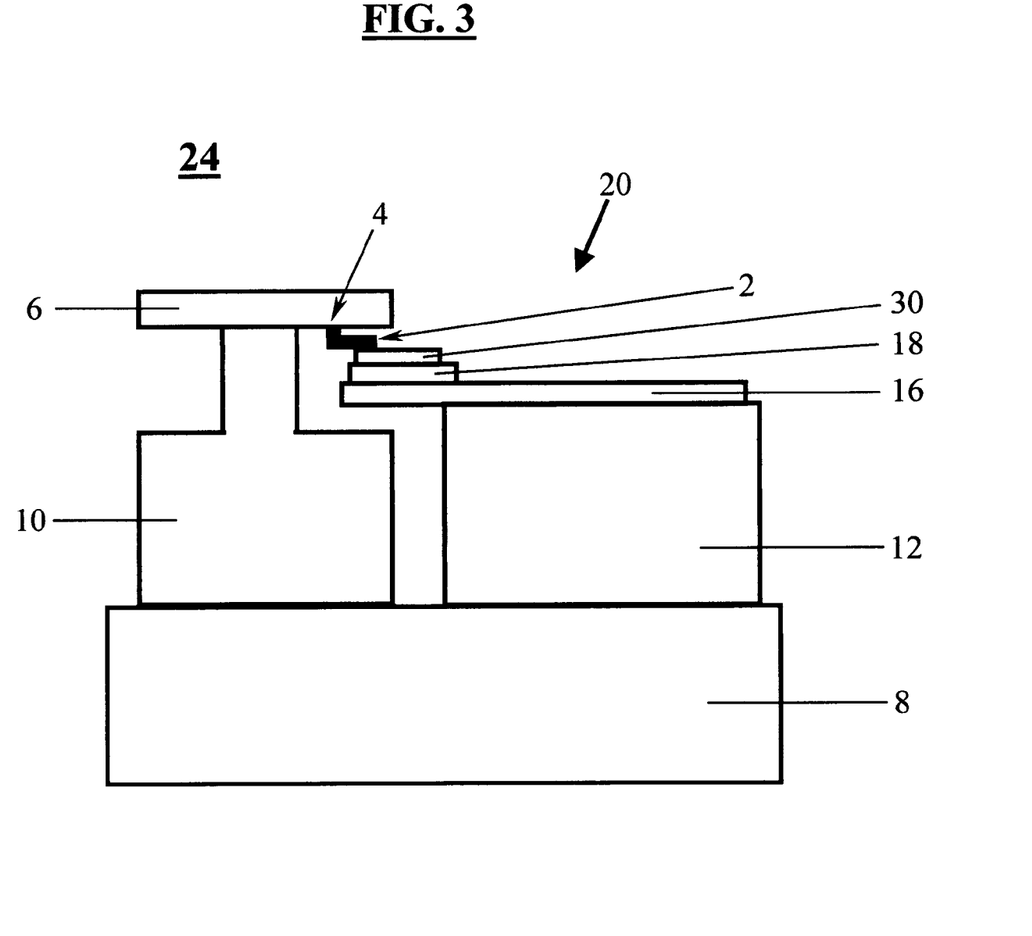
FIG. 3 is a side view schematic illustrating a shear mode micro-actuator integrated into a spinstand, wherein the shear mode micro-actuator interfaces with the head and positions the head.

FIG. 2 and FIG. 3 show, in a side view schematic of a shear mode micro-actuated spinstand 24, two embodiments of the present invention wherein shear mode micro-actuator 30 performs fine positioning.

FIG. 2 is a side view schematic of one embodiment of the present invention wherein shear mode micro-actuator 30 is mounted after arm 16 rather than before arm 16 as diagrammed in FIG. 1, thereby reducing the mass to be moved by an amount equal to the mass of arm 16.

FIG. 3 is a side view schematic of another embodiment of the present invention wherein shear mode micro-actuator 30 is mounted after head tool 18, which again is closer to head 2 and reduces the mass to be moved by an amount equal to the mass of head tool 18.

Figure 4:
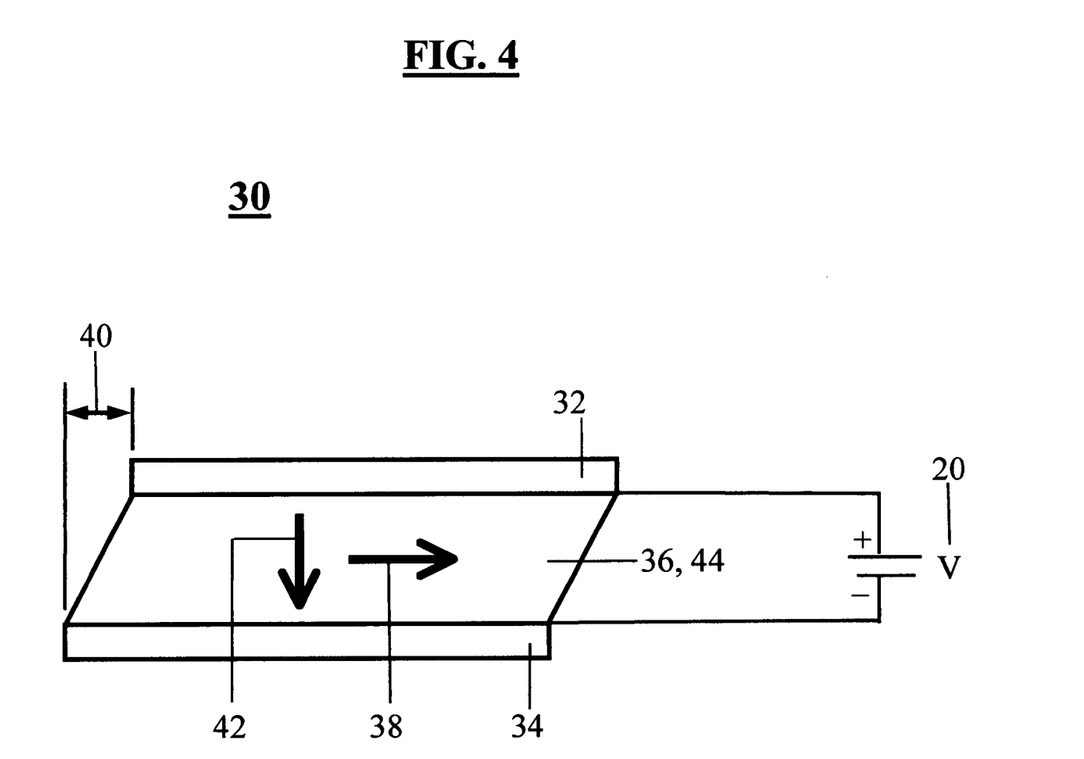
FIG. 4 is a side view schematic illustrating a shear mode micro-actuator.

FIG. 4 is a side view schematic of another embodiment of the present invention showing a shear mode micro-actuator 30 for improving bandwidth of a fine positioning mechanism 14 in data storage equipment that require a fine positioning of a head 2 on or about a track 4. Shear mode micro-actuator 30 comprises a positive electrode 32, a negative electrode 34 and a shear mode piezoelectric material 36, being either a single layer or a multi-layer stack with a polarization 38 parallel to both said positive electrode 32 and said negative electrode 34, wherein said positive electrode 32 undergoes a single axis, in-plane position change 40 relative to said negative electrode 34 through the inverse piezoelectric effect, in a direction parallel to polarization 38, perpendicular to electric field 42 and in-plane with the positive electrode 32 when a position control signal 20 is applied across positive electrode 32 and negative electrode 34. If the polarity of position control signal 20 is reversed, then shear mode displacement 40 is reversed.

Shear mode piezoelectric material 36 is typically comprised of a lead zirconium titanate (PZT) or any other shear mode piezoelectric material that is commercially available. The piezoelectric material 32 can be comprised of a single crystal or polycrystalline piezoelectric material. If the shear mode micro-actuator 30 is comprised of a shear mode piezoelectric stack 44 and the electric field strength is held constant, then the position change 40 is proportional to the number of layers comprising the shear mode piezoelectric stack 44.

Shear mode micro-actuator 30 has an active or micro-positioning side to which is mounted a head 2 or a head tool 18 and an opposite, passive or non-micro-positioning side that mounts to the shear mode micro-actuated spinstand 24. The components of shear mode micro-actuated spinstand 24 to which shear mode micro-actuator 30 can mount include but are not limited to arm 16, coarse positioning mechanism 12 and base 8. Unlike the active side of shear mode micro-actuator 30 that requires minimum mass and maximum stiffness to maximize micro-positioning bandwidth, the passive side of shear mode micro-actuator 30 has less restrictive requirements.

Shear mode micro-actuator 30 can be integrated into a shear mode micro-actuated spinstand 24 by adhesive bonding. Bonding, being one of several mounting methods, provides the rigid mounting desired for high bandwidth operation. Bonding is semi-permanent and does not allow the quick and easy replacement of shear mode micro-actuator 30 from shear mode micro-actuated spinstand 24. Similarly, a head 2 can be adhesively bonded to shear mode micro-actuator 30 but this prevents the rapid replacement of a head 2. If a head tool 18 is adhesively bonded to shear mode micro-actuator 30, then head 2 can be rapidly replaced but head tool 18 cannot be rapidly replaced. Therefore it is desired that shear mode micro-actuator 30 have additional embodiments to allow the rapid changing of a head 2, a head tool 18 and the shear mode micro-actuator 30 itself from the shear mode micro-actuated spinstand 24.

Figure 5:
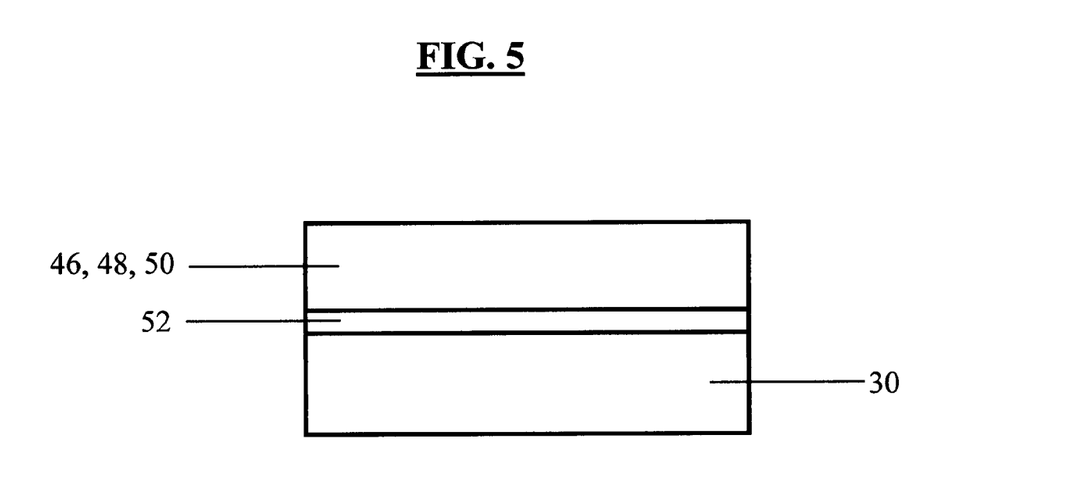
FIG. 5 is a side view schematic illustrating a shear mode micro-actuator to which is mounted a plate.

Because shear mode micro-actuator 30 can interface with head tool 18 and/or head 2, shear mode micro-actuator 30 may have a mounting feature for a head 2 and/or a mounting feature for a head tool 18. Mounting features provide a mechanical alignment mechanism and/or an attachment mechanism. The data storage industry commonly uses a variety of alignment mechanisms such as holes, slots, pins and precision ground surfaces and a variety of attachment mechanisms such as screws and clamps. FIG. 5 shows in a side view schematic, another embodiment of shear mode micro-actuator 30 onto which is mounted a metal plate 46 having a mounting feature for a head 2. In an alternative embodiment, to shear mode micro-actuator 30 is mounted a head plate 48 comprised of ceramic having a mounting feature for a head 2. In another embodiment, to shear mode micro-actuator 30 is mounted a head tool plate 50 having a mounting feature for a head tool 18. Metal plate 46 is preferably composed of stainless steel. Head plate 48 is comprised of ceramic because some ceramic materials have increased stiffness and decreased mass as compared to metal, which helps increase bandwidth. Head plate 48 may be comprised of metal portions such as metal inserts for threaded screws or precision holes and other metal forms for alignment and attachment. Head tool plate 50 can be comprised of metal or ceramic materials.

More specifically to the above embodiments, onto shear mode micro-actuator 30 is bonded a metal plate 46 that clamps a head 2, a head plate 48 comprised of ceramic that clamps a head 2 or a head tool plate 50 that clamps a head tool 18. One method of mounting metal plate 46, head plate 48 and head tool plate 50 to shear mode micro-actuator 30 is with bonding material 52. Bonding material 52 is a thin, uniform adhesive layer that bonds together the entire area of the interfacing surfaces. Adhesive bonding provides rigid attachment that is desired for maximizing stiffness and minimizing vibration. Adhesive bonding is preferred because it consumes minimal volume and adds minimal mass.

Examples of bonding material 52 are conductive epoxy and non-conductive epoxy. Non-conductive epoxy electrically isolates positive electrode 32 and/or negative electrode 34. Conductive epoxy electrically connects metal plate 46 or head tool plate 50 to positive electrode 32 or negative electrode 34. In the case where conductive epoxy electrically connects metal plate 46 or head tool plate 50 directly to shear mode piezoelectric material 36 or shear mode piezoelectric stack 44, then metal plate 46 or head tool plate 50 becomes the positive electrode 32 or negative electrode 34.

Figure 6:
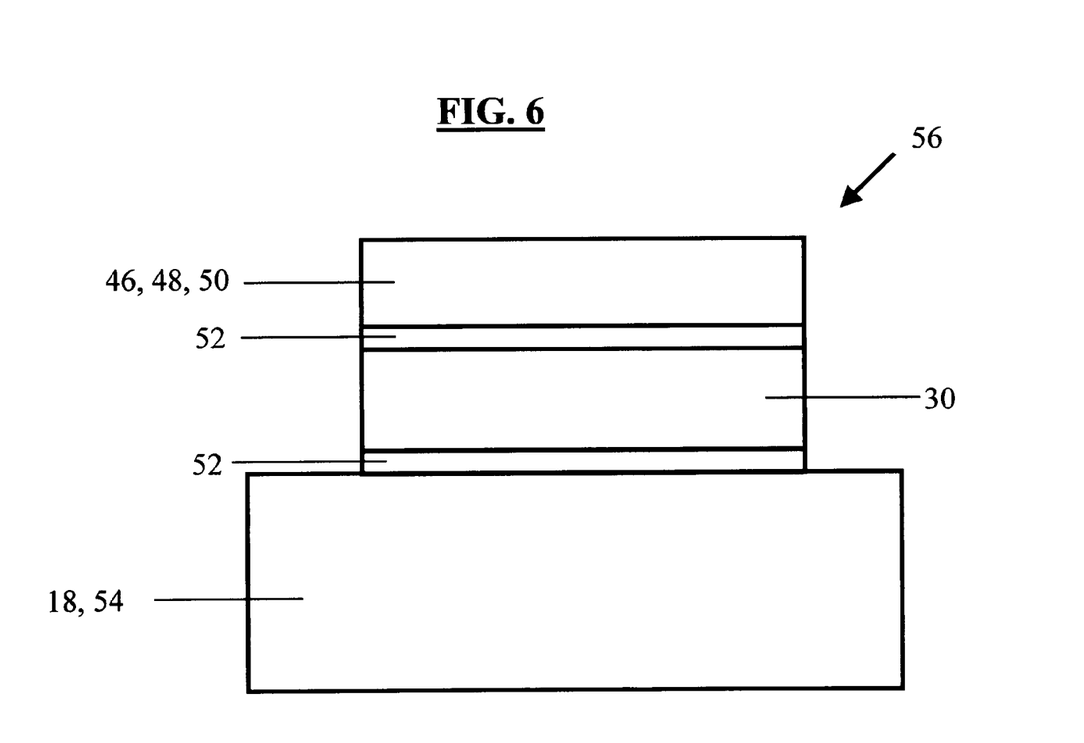
FIG. 6 is a side view schematic illustrating a shear mode micro-actuator to which is mounted a base plate or head tool.

FIG. 6 is a side view schematic of another embodiment of the present invention illustrating a shear mode micro-actuator 30 to which is mounted a base plate 54 by bonding material 52. Base plate 54 facilitates the mounting of shear mode micro-actuator 30 to shear mode micro-actuated spinstand 24. Because base plate 54 is on the passive side of shear mode micro-actuator 30 where there is a less restrictive requirement for minimizing mass, base plate 54 can be comprised of relatively thick stainless steel and be oversized compared to shear mode micro-actuator 30. One method for rigidly mounting base plate 54 to shear mode micro-actuated spinstand 24 that allows the rapid replacement of shear mode micro-actuator 30 is with screws.

Shear mode micro-actuator 30 can be integrated into a head tool 18 creating a shear mode micro-actuated head tool 56. Such integration can be accomplished in a number of ways. One method mounts shear mode micro-actuator 30 onto a head tool 18 using bonding material 52. Another method uses a shear mode micro-actuator 30 with its bonded base plate 54 mounted to a head tool 18 (not illustrated). If base plate 54 is mounted to head tool 18 using screws, then the shear mode micro-actuator 30 can be quickly replaced. All embodiments of shear mode micro-actuated head tool 56 are comprised of a shear mode micro-actuator 30 whereto is mounted a head tool 18 and a plate that has a mounting feature for a head 2, such as with metal plate 46 or head plate 48 comprised of ceramic.

Reducing moving mass improves bandwidth. The mass of a swage mount HGA is roughly 0.05 grams. The mass of a unamount HGA is roughly 0.5 grams. The moving mass of a head 2 mounted to shear mode micro-actuator 30 with a bonded metal plate 46 as depicted in FIG. 3 can be below 10 grams. If metal plate 46 is substituted for head plate 48 comprised of ceramic such as silicon carbide or boron carbide, the moving mass can be below 5 grams. Related art U.S. Pat. No. 6,006,614, which locates the fine positioning mechanism 14 between coarse positioning mechanism 12 and arm 16, has a fine positioning mechanism 14 that moves an arm 16, a head tool 18 and a head 2 plus all the moving components within the fine positioning mechanism 14 itself, creating a total moving mass that can be hundreds of grams.

Shear mode micro-actuator 30 has high stiffness, low vibration and low off-axis distortion because the structure of the micro-actuator 30 is a solid-state, fully supported, compact structure where the stiffness depends more on material properties such as Young's modulus and less on geometry as compared to related art that use spring, frame and cantilever structures. High stiffness is achieved by having components bonded or rigidly mounted. High stiffness and low mass increase resonance frequencies. Vibration and off-axis distortion are low because of the single axis, in-plane motion of a shear mode piezoelectric material and the stiff integration on all axes.

Related art U.S. Pat. No. 6,006,614 and U.S. Patent Application 20020057517 both have piezo actuators that "expand and contract" and deform an added structure that helps create a single axis, in-plane motion for positioning a head 2 on or about a track 4. In U.S. Pat. No. 6,006,614, the deforming structure is a "hollow parallelepiped." In U.S. Patent Application 20020057517 the deformed structure is a "parallel plate spring" structure. Compared to shear mode micro-actuator 30, the added structure increases mass, decreases stiffness, adds vibration and increases off-axis distortion. Shear mode micro-actuator 30 does not require the added structure. Furthermore, the added structure has spring, frame and cantilever properties that are known in the art to have lower stiffness and greater vibration. Lack of stiffness on all axes and resonance modes cause the added structure to exhibit off-axis distortion.

Shear mode micro-actuator 30 increases stiffness, decreases the vibration and reduces off-axis distortion of a fine positioning mechanism compared to related art by eliminating the springs, frames and cantilevers. It is worthwhile to note that if present, arm 16 in shear mode micro-actuated spinstand 24 can made stiffer by adding mass and size to reduce its cantilever effect because the mass of arm 16 is on the passive side of shear mode micro-actuator 30, unlike related art U.S. Pat. No. 6,006,614 where arm 16 is moving mass on the active side of a fine positioning mechanism 14.

Piezoelectric micro-actuators of prior art that "expand and contract" are not using a shear mode piezoelectric micro-actuator and therefore, it is important to differentiate these piezoelectric micro-actuators from shear mode micro-actuator 30. Piezoelectric micro-actuators that expand and contract operate in the transverse piezoelectric mode or longitudinal piezoelectric mode. These transverse and longitudinal mode piezoelectric micro-actuators typically have a beam shape (a long rectangular box) with a positive electrode and a negative electrode located at opposite ends of the lengthwise beam and a polarization direction parallel to the lengthwise beam. When a position control signal 20 is applied to positive electrode and the negative electrode, the resulting electric field is parallel to the polarization and through the inverse piezoelectric effect, the piezoelectric material expands and contracts causing a displacement along a single axis parallel to the polarization direction.

Transverse and longitudinal mode piezoelectric micro-actuators have several disadvantages in this application. Because they expand and contract, these piezoelectric micro-actuators can only be mechanically integrated at the ends of their beam shape where the electrodes are located. The entire middle section of the beam must remain unsupported along its entire length (along the axis of motion) so it is free to expand and contract, which inherently means that it is free to vibrate. Unsupported piezoelectric beams not only react to vibration, they can also source and amplify vibration. These unsupported piezoelectric beams are more susceptible to breakage from off-axis stress or shock. Because the electric field and polarization are parallel, moderate levels of negative voltage can cause depolarization, which degrades or reduces to zero the piezoelectric strain constant, thus limiting displacement, bipolar operation and robustness. Longitudinal and transverse mode micro-actuators exhibit secondary axis motion, whereupon the primary axis expands and contracts, a secondary axis respectively contracts and expands. To improve performance, transverse and longitudinal mode piezoelectric micro-actuators have added mechanics to create in-plane motion, such as a parallel plate spring or a hollow parallelepiped structure but these added mechanics increase moving mass, take up space, vibrate and permit off-axis distortion.

Shear mode piezoelectric micro-actuators have several advantages in this application. Because the fundamental motion is shearing rather than expanding and contracting, the entire electrode surfaces can be mechanically integrated, providing rigid integration that maximizes stiffness, reduces vibration and supports single axis, in-plane motion. Whereas longitudinal and transverse mode micro-actuators exhibit secondary axis motion, shear mode piezoelectric micro-actuators do not exhibit secondary axis motion, providing in-plane motion. Shear mode piezoelectric micro-actuators have the highest piezoelectric strain constant of any piezoelectric mode. It performs well in bipolar operation and does not exhibit depolarization at moderate levels of negative voltage because the electric field is perpendicular to the polarization. Shear mode piezoelectric micro-actuators have a displacement that is independent of thickness, and therefore, can be thin and effective. This is important because it is advantageous to minimize the height of the shear mode micro-actuator 30.

Figure 7:
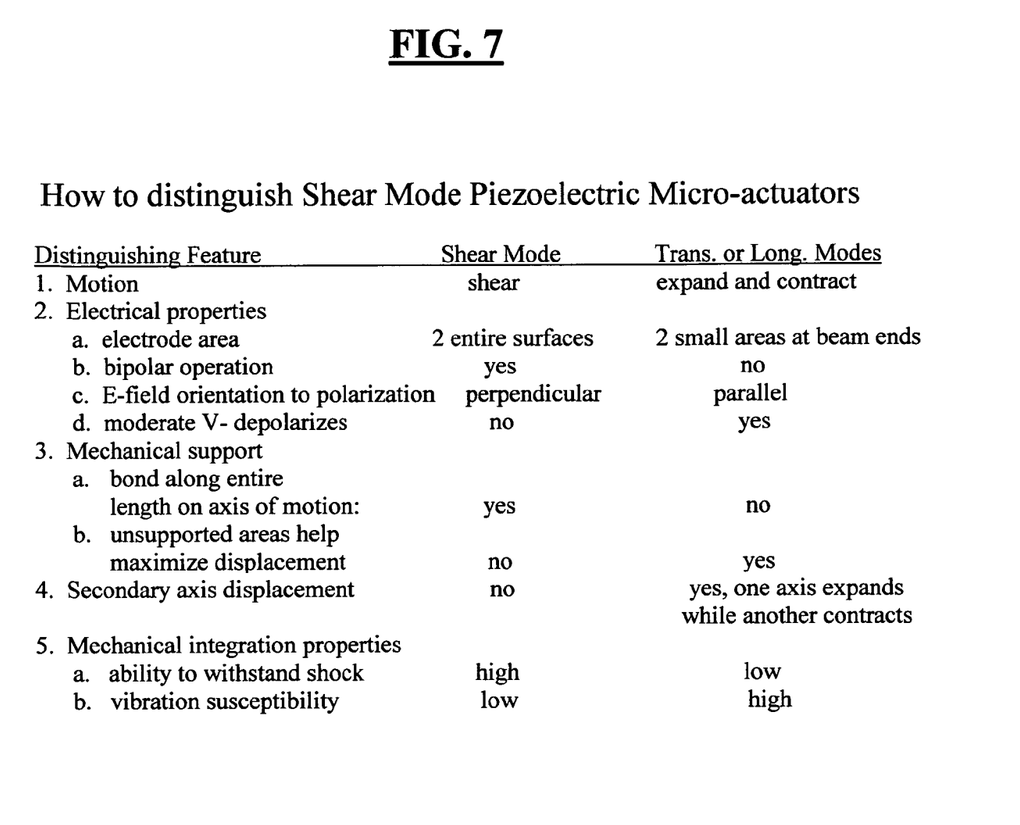
FIG. 7 is a table of features that distinguish a shear mode piezoelectric micro-actuator from either a longitudinal mode or transverse mode piezoelectric micro-actuator.

FIG. 7 is a table of distinguishing features that differentiate the shear mode from the transverse and longitudinal piezoelectric modes. Note that while transverse and longitudinal modes are more difficult to differentiate, the shear mode is easy to differentiate from the transverse and longitudinal modes. This table is useful for distinguishing embodiments of the present invention from prior art and for evaluating new patent applications that may infringe upon embodiments of the present invention.

The shear mode micro-actuator 30 decreases the moving mass, increases stiffness and improves the single axis, in-plane motion with reduced vibration and off-axis distortion compared to prior art and thereby improves the bandwidth of a fine positioning mechanism in data storage manufacturing and test equipment.

To better utilize the mechanical bandwidth of shear mode micro-actuator 30, the bandwidth of the position control signal 20 may need improvement. Improving position control signal 20 involves increasing bandwidth, reducing distortion and/or reducing noise. Position control signal 20 is the output signal of a control loop whose feedback or position input signal is sourced from either a position sensor or track following. Therefore to improve position control signal 20, position sensors and track following need to produce a position input signal with increased bandwidth, reduced distortion and/or reduced noise.

Track following can produce a higher bandwidth position input signal and thereby improve position control signal 20 by having head 2 read an increased number of servo bursts per disk revolution or equivalently increasing the sampling rate. As compared to disk drives, the percentage of disk space devoted to the embedded servo can be greater in manufacturing and test equipment, except for a servo track writer whose written disks are installed in disk drives.

Position sensors avoid the sampling limitation of track following. One method to improve the bandwidth of the position input signal and the position control signal 20 utilizes non-contact position sensors with increased bandwidth, lower distortion and lower noise. Types of non-contact position sensor are an optical position sensor, a capacitance gage, an interferometer and a laser Doppler vibrometer (LDV). Non-contact position sensors are capable of measuring position with resolution better than 1 nanometer with bandwidth exceeding 100 kHz. A sampling rate of 500 kHz or higher may be required to fully utilize the mechanical bandwidth of the shear mode micro-actuator 30.

Figure 8:
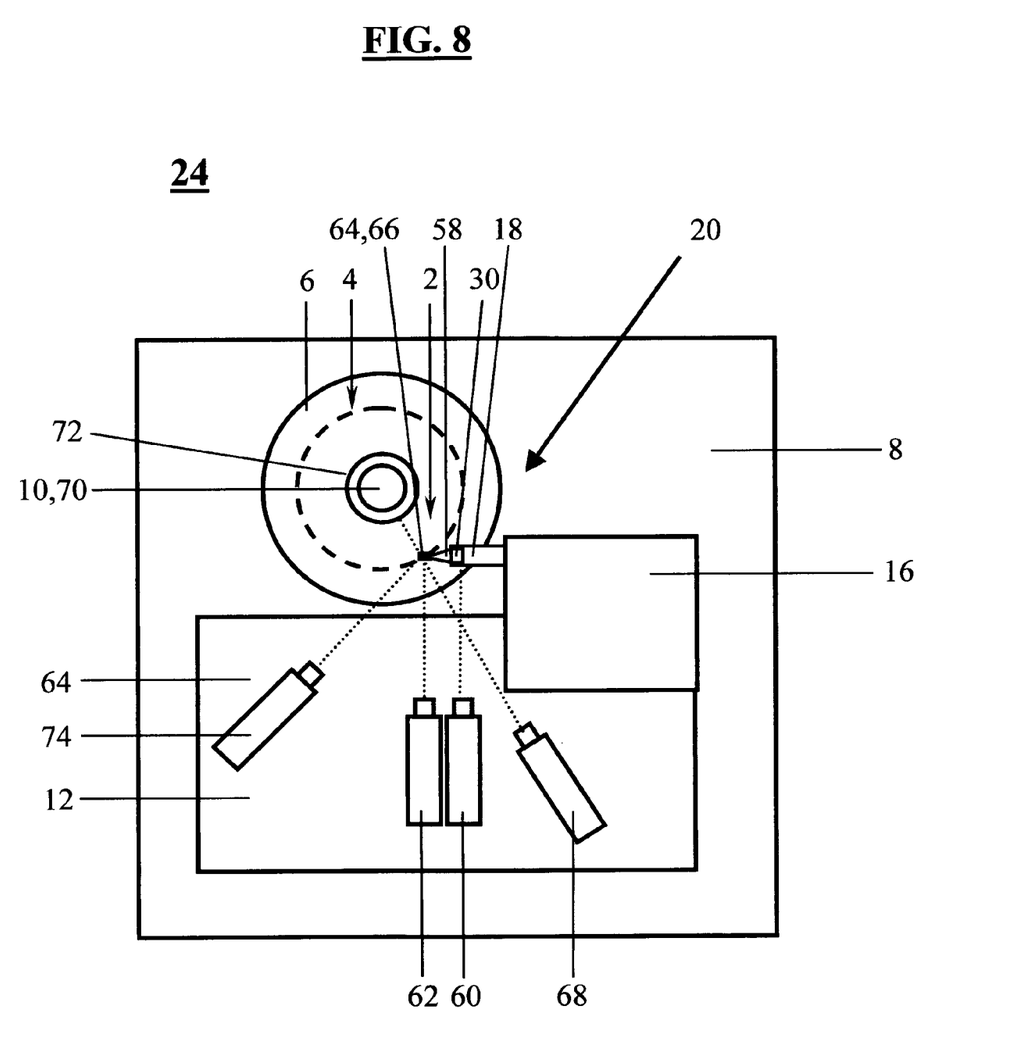
FIG. 8 is a top view schematic illustrating a shear mode micro-actuated spinstand having one or more non-contact position sensors that sense mechanical disturbance.

FIG. 8 is a top view schematic illustrating a shear mode micro-actuated spinstand 24 comprised with one or more non-contact position sensors for sensing mechanical disturbance that mis-positions head 2 relative to track 4. Types of mechanical disturbance observed in a spinstand are spindle run-out, disk flutter, head vibration and spinstand vibration. Head vibration is a high frequency mechanical disturbance that primarily involves suspension assembly 58 where windage excites resonance modes that cause off-track displacement. Head vibration contributes more to the track mis-registration (TMR) as disk rotation rates and track densities increase in disk drives, which also effects manufacturing and test equipment. Spinstand vibration is a low frequency mechanical disturbance whereby a rotating spindle motor 10, a spinning disk medium 6 and an accelerating coarse positioning mechanism 12 excite vibrations in the stack of hardware between the head 2 and base 8.

Micro-actuator position sensor 60 senses the position of shear mode micro-actuator 30 using a non-contact position sensor. In the preferred embodiment, micro-actuator position sensor 60 is comprised of an LDV mounted to coarse positioning mechanism 12 with the LDV laser beam, illustrated as a dotted line, aligned and focused on the side of metal plate 46 or head plate 48 of shear mode micro-actuator 30 to which head 2 is mounted. The laser spot can be equivalently aligned and focused on any suitable reflecting surface between and including the active side of shear mode micro-actuator 30 and the mount plate of head 2.

Head position sensor 62 senses position of head 2 using a non-contact position sensor. In the preferred embodiment, head position sensor 62 is comprised of an LDV mounted to coarse positioning mechanism 12 with the laser beam aligned and focused on the trailing edge side of slider 64, a component of head 2. Head position sensor 62 senses the relative position of read/write transducer 66 of head 2 because read/write transducer 66 of head 2 is located a fixed distance from the trailing side edge of slider 64. High bandwidth sensing is valid because transducer 66 is rigidly integrated to slider 64 and the interface has no mechanical loss.

Spindle run-out position sensor 68 senses the run-out of spindle 70, a component of spindle motor 10 to which disk medium 6 mounts using a non-contact position sensor. In rotating equipment, the spindle 70 has repeatable run-out (RRO) and the non-repeatable run-out (NRRO) that mis-positions head 2 relative to track 4 by mechanically displacing track 4. In one embodiment, spindle run-out position sensor 68 is comprised of an LDV with the laser beam aligned and focused on one of several surfaces capable of sensing spindle run-out. Measuring spindle run-out with the LDV laser aligned on spindle 70 may have insufficient resolution in position and time due to the small radius and the poor surface finish of spindle 70. Measuring spindle run-out with the LDV laser aligned on the outer side edge of disk medium 6 may have poor signal due to disk flutter and poor surface finish. To overcome these issues, a spindle run-out reference disk 72 is mounted to spindle 70. Spindle run-out reference disk 72 has a sufficiently large radius and a sufficiently fine surface finish on its outer side edge to reduce spindle run-out measurement distortion and noise. Spindle run-out reference disk 72 is rotationally balanced and has a thickness sufficient to have negligible disk flutter. Spindle run-out reference disk 72 reflects with low optical distortion light from an LDV or other non-contact position sensor that characterizes spindle run-out. Another embodiment of spindle run-out position sensor 68 uses a capacitance sensor mounted to base 8 and located in close proximity spindle 70 or spindle run-out reference disk 72 (not shown). Spindle run-out is ideally measured on an axis whose radius extends out from the center of disk rotation and intersects with head 2, else a second sensor or a geometry correction may be required.

Disk flutter position sensor 74 comprised of a non-contact position sensor senses disk flutter, which is a vertical displacement of disk medium 6 that mis-positions head 2 relative to track 4 on the off-track axis. In one embodiment, disk flutter position sensor 74 is comprised of an LDV mounted to coarse positioning mechanism 12 with the laser beam aligned and focused on the disk surface to which head 2 faces with the laser measurement spot located in close proximity to read/write transducer 66 of head 2. The as shown LDV is horizontally mounted so a reflecting mirror (not shown) is required to redirect the laser beam normal to the surface of disk medium 6. A disk flutter transfer function that converts vertical disk displacement into off-track head displacement can be directly measured or calculated and may be used to compensate disk flutter.

A head vibration input signal is generated by sensing the position of transducer 66 with head position sensor 62 and passing the signal through a high pass filter to remove the low frequency position changes intentionally induced by position control signal 20 and shear mode micro-actuator 30 that compensate low frequency mechanical disturbances. As head vibration is ideally zero, this signal can be minimized using a control loop. Negative feedback is one technique available to minimize the head vibration input signal. The high bandwidth of shear mode micro-actuator 30 and the high bandwidth, real time sensing of head vibration makes possible active damping compensation. Feedforward may also be used. Feedforward works by predicting the compensation required based upon the head's mechanical transfer curve, more commonly known as a frequency response function (FRF) which is the non-linear frequency response in both gain and phase of suspension assembly 58 of head 2, and correcting the gain and phase of the head vibration input signal.

Alternatively, head vibration is sensed as difference between a first non-contact position sensor that senses the relative position of transducer 66 and a second non-contact position sensor that senses the position of shear mode micro-actuator 30. Micro-actuator position sensor 62 senses the position of head 2 at transducer 66 and head position sensor 60 senses the position of shear mode micro-actuator 30 to which head 2 is mounted. The preferred embodiment uses two LDVs as described above because each measures where desired, each has a bandwidth exceeding 1 MHz and each resolves position below 1 nanometer. Subtracting the position of shear mode micro-actuator 30 from head position sensor 62 removes by common mode rejection both spinstand vibration and the intentionally induced position changes due to position control signal 20 driving shear mode micro-actuator 30. This difference signal or differential signal senses head vibration such as due to windage and head actuation loss due to insufficient stiffness at high frequencies of suspension assembly 58.

Spinstand vibration is defined to be the off-track vibration measured between shear mode micro-actuator 30 and base 8. One method of measuring spinstand vibration uses a single non-contact position sensor such as an LDV mounted to base 8 with the laser beam aligned and focused on shear mode micro-actuator 30 (not shown). The axis of measurement is coincident with the off-track axis, else two orthogonal measurements and geometry corrections may be required to account for skew angle of head 2. Spinstand vibration may also be sensed with contact sensors. For instance, accelerometers may be mounted on the stationary side of shear mode micro-actuator 30 where added mass is not a problem. This measurement is valid because spinstand vibration is relatively low frequency and because the stiffness of shear mode micro-actuator 30 is high on all axes. Isolating spinstand vibration from other sources of mechanical disturbance is not necessary in cases such as the track following where an input signal inherently includes spinstand vibration. Spinstand vibration is ideally minimized to an insignificant level through design optimization. Spinstand vibration is minimized by iteratively measuring vibration and modifying the spinstand design through increasing mass and stiffness until all resonance mode gains and frequencies are acceptable.

It is understood that shear mode micro-actuated spinstand 24 can be differently configured as compared to the schematic of FIG. 8. For instance, rather than coarse positioning mechanism 12 moving head 2 to the desired test radius and skew angle relative to a disk rotation axis with fixed position, the coarse positioning mechanism 12 can be located between base 8 and spindle motor 10 so that it moves the rotation axis of disk 6 to the desired test radius and skew angle relative to head 2, leaving position sensors 60, 62 and 68 mounted to base 8.

With reference to the apparatus described above, a method for improving bandwidth of a fine positioning mechanism in data storage manufacturing and test equipment that requires fine positioning of a head 2 on or about a track 4 comprises the steps of:

sensing separate sources of mechanical disturbance that mis-position the head 2 with one or more non-contact position sensors, generating a compensating position control signal from one or more input signals, and positioning the head 2 with a fine positioning mechanism 14 and position control signal 20.

The mechanical disturbance being sensed with one or more non-contact position sensors include at least one member of the collection comprising spindle run-out, disk flutter, head vibration and spinstand vibration. One or more non-contact position sensors sense the relative position of at least one member of the collection comprising a spindle, a disk, a spindle run-out reference disk, a fine positioning mechanism and a head. Separately sensing sources of mechanical disturbance with one or more non-contact position sensors allows each mechanical disturbance to be optimally sensed in terms of bandwidth and resolution, analyzed in terms of repeatable and non-repeatable characteristics and individually compensated with their respective transfer functions and with feedback and feedforward control techniques. In contrast, track following senses all sources of mechanical disturbance at once making impractical the individual compensation of each separate disturbance.

Input signals from separately sensing sources of mechanical disturbance include at least one member of the collection comprising a spindle run-out input signal, a disk flutter input signal, a head vibration input signal and a spinstand vibration input signal. Additional input signals are the track following signal, track following input signal and the compensated track following signal. The track following input signal is either the decoded servo burst position between the head 2 and track 4 or the position error signal (PES), which includes a reference position. The reference position is important for setting the off-track distance in track profile and error rate tests. The compensated track following signal is the controller output in a track following control loop. The track following signal is either the track following input signal or the compensated track following signal and is used when referring to either or both signals.

A compensating position control signal has the positioning information to compensate a mechanical disturbance. Generating a compensating position control signal requires different steps depending upon the purpose of the compensation and number of input signals. For the purpose of reducing head vibration with negative feedback, the step of generating a compensating position control signal from one or more input signals further comprises the steps of: inverting the phase and adjusting the gain of the head vibration input signal. For the purpose of reducing written-in run-out through common mode rejection, the step of generating a compensating position control signal from one or more input signals further comprises the steps of: preserving the phase and adjusting the gain from one or more input signals in a collection comprising spindle run-out, disk flutter and spinstand vibration. For the purpose of reducing head vibration using feedforward, the step of generating a compensating position control signal from one or more input signals further comprises the steps of: correcting the gain and phase of the head vibration input signal based upon the frequency response function of head 2.

Each separately sensed mechanical disturbance has an individually generated compensating position control signal. Because only one position control signal 20 drives the fine positioning mechanism 14 to position head 2, each compensating position control signal is superimposed into a single position control signal 20. Therefore when more than one compensating position control signal is generated, the step of generating a compensating position control signal from one or more input signals further comprises the step of: superimposing two or more compensating position control signals into a single position control signal 20.

Positioning head 2 with a fine positioning mechanism 14 and a position control signal 20 is the last step of the method. The preferred embodiment uses a shear mode micro-actuator 30 as the fine positioning mechanism 14.

One of several methods for improving the bandwidth of a fine positioning mechanism is now discussed by way of example and not limitation for the application of reducing head vibration and improving track following. Track following bandwidth is limited to a few kilohertz and is incapable of sensing high frequency head vibration. The electrical bandwidth of position control signal 20 is increased by separately sensing head vibration with one or more high bandwidth non-contact sensors described above for shear mode micro-actuated spinstand 24, generating a compensating head vibration position control signal by inverting the phase and adjusting the gain of the head vibration input signal and superimposing the track following and head vibration compensating position control signals into a single position control signal 20. Position control signal 20 has improved electrical bandwidth because the bandwidth of the head vibration input signal is greater that the bandwidth of track following input signal. The bandwidth of a fine positioning mechanism is also improved by the use of shear mode micro-actuator 30.

Reducing head vibration is important. Head vibration is a high frequency mechanical disturbance that mis-positions the head during both the write and read process. Head vibration mis-positions head 2 during the write process causing a high frequency disturbance in the recorded track 4 that contributes to written-in run-out. Head vibration also mis-positions the head 2 during the read process adding high frequency noise that degrades both the data signal and the track following input signal. The track following input signal has a double dose of head vibration distortion, one from the write process in the form of written-in run-out and a second from the read process.

The method for improving the bandwidth of a fine positioning mechanism is now discussed by way of example and not limitation for the application of reducing written-in run-out. The mechanical disturbance for written-in run-out comprise spindle run-out, disk flutter, spinstand vibration and head vibration. One or more sources of mechanical disturbance for written-in run-out are separately sensed with high bandwidth, non-contact position sensors integrated into shear mode micro-actuated spinstand 24. Each mechanical disturbance is individually compensated by a transfer function. For example, a disk flutter transfer function converts the sensed vertical disk displacement into a head displacement error along the off-track axis. Transfer functions also compensate geometry-induced errors related to the head's skew angle, the position sensor's measurement axis and the micro-actuator's positioning axis. The method wherein the step of generating a compensating position control signal from one or more input signals is for reducing written-in run-out through common mode rejection caused by at least one member of a collection comprising spindle run-out, disk flutter and spinstand vibration (and excluding head vibration) further comprises the steps of: preserving the phase and adjusting the gain of the sensed head vibration signal. Preserving the phase causes the fine-positioning mechanism 14 to follow the sensed written in run-out mechanical disturbance so that by common mode rejection, the written-in run-out recorded on the disk is reduced. Additionally, head vibration is sensed while writing using one or more LDVs as previously described with the head vibration input signal compensated with negative feedback and feedforward. All compensating position control signals are superimposed into a single position control signal 20. Head 2 is positioned by shear mode micro-actuator 30 and position control signal 20. High bandwidth sensing generates a high bandwidth position control signal 20. The high mechanical bandwidth of shear mode micro-actuator 30 and high electrical bandwidth position control signal 20 improve the bandwidth of a fine-positioning mechanism.

Figure 9:
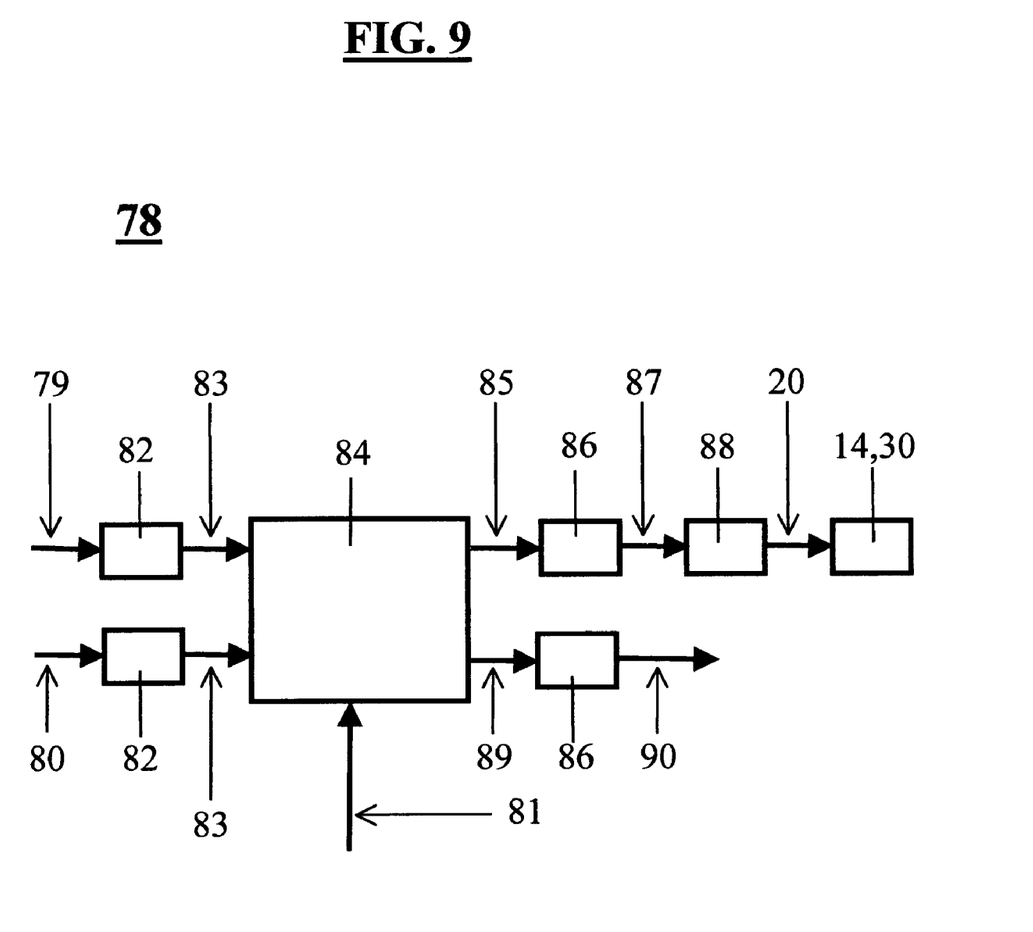
FIG. 9 is a schematic illustrating a digital control loop whose input is one or more non-contact position sensors that sense mechanical disturbance and whose output is a position control signal.

FIG. 9 illustrates a digital control loop 78 that reduces the mis-positioning of head 2 on or about a track 4. One or more non-contact position sensors sense separate sources of mechanical disturbance that mis-position head 2. Digital control loop 78 receives one or more inputs in the form of an analog sensor signal 79 such as from position sensors 60, 62, 68, and/or 74, an analog track following signal 80 and a digital position command 81. Examples of analog sensor signal 79 are the head vibration input signal, the spindle run-out input signal, the disk flutter input signal and the spinstand vibration input signal. Track following signal 80 is either a track following input signal or a compensated track following signal, such as from an analog control loop. Digital position command 81 is a command from the user interface or a test routine that, for example, offsets the position of head 2 a defined distance from the center of track 4 in a track profile test. Digital position command 81 may be a reference signal with DC and time varying components. Each analog sensor signal 79 and the track following signal 80, if present, are digitized by analog to digital converter 82. Each digital signal 83 is sent to a computation device 84 that generates a digital compensating position control signal 85, which is converted by digital-to-analog converter 86 into analog signal 87. Analog signal 87 is amplified by amplifier 88 creating position control signal 20. Position control signal 20 drives a fine positioning mechanism 14, such as shear mode micro-actuator 30, to compensate the position of head 2. Computation device 84 can also output a digital output signal 89 to a digital-to-analog converter 86 creating an analog output signal 90. Analog output signal 90 may be used as a signal input to another analog or digital controller or for monitoring compensating processes inside computation device 84.

Computation device 84 continuously calculates and outputs a digital compensating position control signal 85 as digitized sensor data streams in. Computation device 84 is comprised of at least one member of the collection comprising a computer, microprocessor, digital signal processor (DSP) and memory. Computation device 84 performs one or more of the following functions comprising calculating the difference between two signals, compensating signals by inverting the phase and adjusting the gain, compensating signals by preserving the phase and adjusting the gain, superimposing signals, calculating repeatable run-out, calculating non-repeatable run-out by subtracting repeatable run-out from a signal, multiplying a signal by a transfer function, correcting a signal's gain and phase based upon a head's frequency response function, calculating FFTs, storing transfer functions, FFT spectrums, polynomial coefficients and setup parameters and generating a digital compensating position control signal 85. Being software programmable, computation device 84 is quickly adapted to perform different kinds of testing, sensing of mechanical disturbances and generating of compensating position control signals thus enabling shear mode micro-actuated spinstand 24 to perform a variety of functions and purposes as different as between a servo track writer and a head tester.

It is readily apparent that with multiple position sensors and multiple methods to generate a compensating position control signal, more than one method can accomplish the same goal. Consider an example where the goal is to minimize written-in run-out due to spindle run-out for head 2 positioned with zero skew angle. Whereas a first method may use three LDVs as position sensors 60, 62 and 68 respectively focused on shear mode micro-actuator 30, transducer 66 and spindle reference disk 72, an alternative method uses two LDVs as position sensors 62 and 68 focused respectively focused transducer 66 and spindle reference disk 72. The sensing of mechanical disturbance and the generating of a position control signal 20 are different in the two methods but the goal is the same. Another example of multiple methods to accomplish the same goal pertains to LDV signals wherein a velocity signal is used rather than a position signal. As a last example, one method might use digital control loop 78 to generate compensating position control signals for both the head vibration input signal and the track following input signal while another method uses an analog control loop to generate a track following compensating position control signal and uses the digital control loop 78 to compensate the head vibration signal and superimpose the track following and head vibration compensating position control signals into a single position control signal 20.

While various embodiments have been described above, it should be understood that they have been presented by way of example only, and not limitation. Thus, the breadth and scope of a preferred embodiment should not be limited by any of the above exemplary embodiments, but should be defined only in accordance with the following claims and their equivalents.

What I claim is:

1. A method for improving bandwidth of a fine positioning mechanism in data storage manufacturing and test equipment that requires fine positioning of a head on or about a track comprising the steps of:
    sensing separate sources of mechanical disturbance that mis-position the head with one or more non-contact position sensors,
    generating a compensating position control signal from one or more input signals, and
    positioning the head with a fine positioning mechanism and position control signal.

2. The method as in claim 1 wherein said sources of mechanical disturbance include at least one member of the collection comprising spindle run-out, disk flutter, head vibration and spinstand vibration.

3. The method as in claim 1 wherein said one or more non-contact position sensors sense the relative position of at least one member of the collection comprising a spindle, a disk, a spindle run-out reference disk, a fine positioning mechanism and a head.

4. The method as in claim 1 wherein said fine positioning mechanism is a shear mode micro-actuator.

5. The method as in claim 1 wherein said one or more non-contact position sensors are an optical position sensor, a capacitance gage, an interferometer or a laser Doppler vibrometer.

6. The method in claim 1 wherein said one or more non-contact position sensors sense head vibration as the signal difference between a first non-contact position sensor that senses the relative position of the transducer and a second non-contact position sensor that senses the position of the fine positioning mechanism to which the head is mounted.

7. The method in claim 1 wherein said one or more non-contact position sensors sense head vibration as the signal difference between a first laser Doppler vibrometer that senses the relative position of the head's transducer at the trailing side edge of the slider and a second laser Doppler vibrometer that senses the relative position of the micro-actuator to which the head is mounted.

8. The method in claim 1 wherein the step of generating a compensating position control signal from one or more input signals further comprises the steps of:
    inverting the phase and adjusting the gain of the head vibration input signal.

9. The method in claim 1 wherein the step of generating a compensating position control signal from one or more input signals further comprises the steps of:
    superimposing two or more compensating position control signals into a single position control signal.

10. The method as in claim 1 wherein said one or more input signals includes a track following signal.

11. The method as in claim 1 wherein said one or more input signals is a track following signal and a head vibration input signal.

12. The method in claim 1 wherein the step of generating a compensating position control signal from one or more input signals whose purpose is to reduce written-in run-out through common mode rejection further comprises the steps of:
    preserving the phase and adjusting the gain from one or more input signals in a collection comprising spindle run-out, disk flutter and spinstand vibration.

13. The method in claim 1 wherein said position control signal extends bandwidth by superimposing a track following and a head vibration compensating position control signal into a single position control signal.

14. The method in claim 1 wherein a compensating position control signal for reducing written-in run-out is superimposed with a compensating position control signal for reducing head vibration to produce a position control signal.

15. The method in claim 1 wherein said position control signal is generated inside a digital control loop.

16. The method in claim 1 wherein the step of generating a compensating position control signal from one or more input signals further comprises the step of:
    multiplying a signal by a transfer function.

17. The method in claim 1 wherein the step of generating a compensating position control signal from one or more input signals further comprises the steps of:
    correcting the gain and phase of a head vibration input signal based upon the frequency response function of the head for reducing head vibration.

18. The method in claim 1 wherein said data storage manufacturing and test apparatus is a head tester, a disk tester, a tape tester, a disk certifier, a media certifier, a servo track writer, a head/disk tester, a spinstand or a test stand.

19. A data storage manufacturing and test apparatus that requires fine positioning of a head on or about a track comprising:
    a head,
    a medium,
    a motor that moves the medium, and a
    shear mode micro-actuator comprising a positive electrode, a negative electrode and a shear mode piezoelectric material, being either a single layer or a multi-layer stack, with a polarization parallel to both said positive electrode and said negative electrode,
    wherein said positive electrode undergoes a single axis, in-plane position change relative to said negative electrode through the inverse piezoelectric effect, in a direction parallel to the polarization and in-plane with the positive electrode when a position control signal is applied across said positive electrode and said negative electrode.

20. The data storage manufacturing and test apparatus according to claim 19 wherein said shear mode micro-actuator has a mounting feature for a head.

21. The data storage manufacturing and test apparatus according to claim 19 wherein said shear mode micro-actuator has a mounting feature for a head tool.

22. The data storage manufacturing and test apparatus according to claim 19, wherein said data storage manufacturing and test apparatus is a head tester, a disk tester, a tape tester, a disk certifier, a media certifier, a servo track writer, a head/disk tester, a spinstand or a test stand.

23. The data storage manufacturing and test apparatus according to claim 19 wherein said apparatus has one or more non-contact position sensors for sensing mechanical disturbance that mis-positions said head relative to said track.

24. The data storage manufacturing and test apparatus according to claim 23 wherein said non-contact position sensor is an optical position sensor, a capacitance gage, an interferometer or a laser Doppler vibrometer.

25. The data storage manufacturing and test apparatus according to claim 23 wherein said one or more non-contact position sensors measure the relative position of a spindle, a disk, a spindle run-out reference disk, shear mode micro-actuator and/or head.

26. The data storage manufacturing and test apparatus according to claim 23 wherein said mechanical disturbance is includes at least one member of the collection comprising spindle run-out, disk flutter, head vibration and spinstand vibration.

27. The data storage manufacturing and test apparatus according to claim 23 wherein said one or more non-contact position sensors is a laser Doppler vibrometer that senses spindle run-out.

28. The data storage manufacturing and test apparatus according to claim 23 wherein said one or more non-contact position sensors is a laser Doppler vibrometer that senses disk flutter.

29. The data storage manufacturing and test apparatus according to claim 23 wherein said one or more non-contact position sensors is a laser Doppler vibrometer that senses the relative position of the micro-actuator to which the head is mounted.

30. The data storage manufacturing and test apparatus according to claim 23 wherein said one or more non-contact position sensors is a laser Doppler vibrometer that senses the relative position of the head's transducer at the trailing side edge of the slider.

31. The data storage manufacturing and test apparatus according to claim 23 wherein said one or more non-contact position sensors sense head vibration as the signal difference between a first non-contact position sensor that senses the relative position of the head's transducer and a second non-contact position sensor that senses the position of shear mode micro-actuator to which the head is mounted.

32. The data storage manufacturing and test apparatus according to claim 23 wherein said one or more non-contact position sensors sense head vibration as the signal difference between a first laser Doppler vibrometer that senses the relative position of a head's transducer at the trailing side edge of the slider and a second laser Doppler vibrometer that senses the relative position of the micro-actuator to which the head is mounted.

33. The data storage manufacturing and test apparatus according to claim 19 wherein said position control signal is generated from a track following signal and a head vibration signal.

34. The data storage manufacturing and test apparatus according to claim 19 wherein said position control signal is computed from one or more non-contact position sensors which sense separate sources of mechanical disturbance that mis-position said head and which output an analog sensor signal that is
digitized by an analog to digital converter,
sent to a computation device that generates a digital compensating position control signal which is
converted back to an analog signal by an digital to analog converter and amplified by an amplifier to produce said position control signal which subsequently
positions the head with shear mode micro-actuator.

35. A shear mode micro-actuator for data storage manufacturing and test equipment that require fine positioning of a head on or about a track comprising:
a positive electrode,
a negative electrode and
a shear mode piezoelectric material, being either a single layer or a multi-layer stack with a polarization parallel to both said positive electrode and said negative electrode,
wherein said positive electrode undergoes a single axis, in-plane position change relative to said negative electrode through the inverse piezoelectric effect, in a direction parallel to the polarization and in-plane with the positive electrode when a position control signal is applied across said positive electrode and said negative electrode.

36. A shear mode micro-actuator according to claim 35 wherein said shear mode micro-actuator is comprised of single crystal or polycrystalline shear mode piezoelectric material, either in a single layer or a multi-layer stack.

37. A shear mode micro-actuator according to claim 35 whereon is mounted a metal plate having a mounting feature for a head.

38. A shear mode micro-actuator according to claim 35 whereon is mounted a head plate comprised of ceramic having a mounting feature for a head.

39. A shear mode micro-actuator according to claim 35 whereon is mounted a head tool plate having a mounting feature for a head tool.

40. A shear mode micro-actuator according to claim 35 whereon is bonded a head tool plate that clamps a head tool.

41. A shear mode micro-actuator according to claim 35 whereon is bonded a metal plate that clamps a head.

42. A shear mode micro-actuator according to claim 35 whereon is bonded a head plate comprised of ceramic that clamps a head.

43. A shear mode micro-actuator according to claim 35 that is integrated into a head tool.

44. A shear mode micro-actuator according to claim 35 wherein said micro-actuator is mounted to a head tool and a plate that has a mounting feature for a head.

45. A shear mode micro-actuator according to claim 35 wherein the data storage manufacturing and test equipment comprises a head tester, a disk tester, a tape tester, a disk certifier, a media certifier, a servo track writer, a head/disk tester, a spinstand or a test stand.

46. A method for improving bandwidth of a fine positioning mechanism in data storage manufacturing and test equipment that require fine positioning of a head on or about a track comprising the step of:
using a shear mode micro-actuator comprised of a positive electrode, a negative electrode and a shear mode piezoelectric material, being either a single layer or a multi-layer stack, with a polarization parallel to both said positive electrode and said negative electrode,
wherein said positive electrode undergoes a single axis, in-plane position change relative to said negative electrode through the inverse piezoelectric effect, in a direction parallel to the polarization and in-plane with the positive electrode when a position control signal is applied across said positive electrode and said negative electrode.

* * * * *